(No Model.)

B. KUCKEN.

WIRE LATTICE.

No. 244,063. Patented July 12, 1881.

Witnesses.

Inventor:
Bernard Kucken
per Henry E. Roeder
Attorney.

UNITED STATES PATENT OFFICE.

BERNARD KÜCKEN, OF STRALSUND, PRUSSIA, GERMANY.

WIRE LATTICE.

SPECIFICATION forming part of Letters Patent No. 244,063, dated July 12, 1881.

Application filed February 10, 1881. (No model.) Patented in Germany November 28, 1879.

*To all whom it may concern:*

Be it known that I, BERNARD KÜCKEN, a subject of the King of Prussia, residing at Stralsund, in the Kingdom of Prussia, German Empire, have invented a new and useful Improvement in Wire Lattices, (for which I have obtained a patent in Germany, No. 9,697, dated November 28, 1879,) of which the following is a specification.

My invention relates to improvements in wire lattices which can be taken to pieces and put together at pleasure; and the object of my improvement is to form links of such shape that they can easily be put together without the use of tools.

Figure 1:
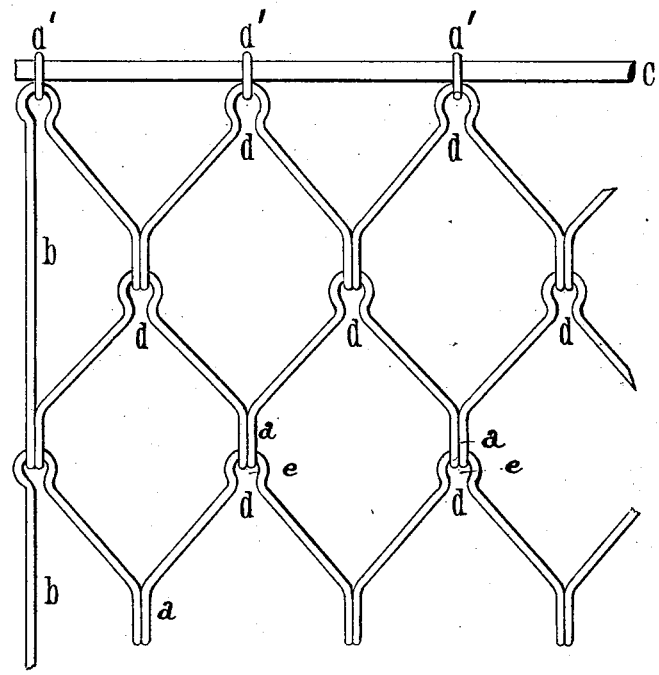
Figure 2:
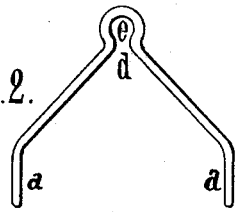
Figure 3:

In the accompanying drawings, Figure 1 is a front view of a lattice put together. Fig. 2 is a front view of a link, and Fig. 3 is a side view of the same.

The lattice is composed of a number of triangular links, $d$, which are put together. The link $d$ is a triangular piece of wire, bent in the middle at its apex to form an open eye, $e$, and at its ends with closed oblong eyes $a$. These links $d$ are put together in such a manner that the eye $e$ of one link rests in two eyes, $a$, of two adjoining links of the upper series. The upper and lower links are connected to a cross-bar or frame, C, by means of rings $a'$. The end links $b$ are formed in such a way that the angle of the triangular shape is made smaller than in the links $d$ by making one of the legs straight and at the same time longer than the other leg, so that the shorter diagonal leg will connect with the eye $e$ of the second row of links and the longer and straight leg with the eye $e$ of the third row of links.

It is self-evident that by varying the shape or angle and the length of the sides of the links $d$, as well as the thickness of the wire, different patterns of lattice can be produced.

What I claim as my invention, and desire to secure by Letters Patent, is—

A dissectible wire lattice consisting of the combination of triangular-shaped links $d$ and triangular-shaped end links, $b$, having at their apex open eyes $e$ and at their lower ends closed eyes $a$, with the rings $a'$ and cross-bars C, substantially in the manner and for the purpose set forth.

BERNARD KÜCKEN.

Witnesses:
BANCROFT C. DAVIS,
FRANK C. ZIMMERMAN.